United States Patent [19]

Kissling et al.

[11] Patent Number: 4,838,896

[45] Date of Patent: Jun. 13, 1989

[54] COMPOSITION USEFUL FOR AFTERTREATING DYEINGS, PRINTINGS AND OPTICAL BRIGHTENINGS: EPIHALDHYDRIN-AMMONIA REACTION PRODUCT AND ALLYLAMINE POLYMER

[75] Inventors: Bruno Kissling, Hagendorf; Tibor Robinson, Basel, both of Switzerland

[73] Assignee: Sandoz Ltd., Basel, Switzerland

[21] Appl. No.: 151,032

[22] Filed: Feb. 1, 1988

[30] Foreign Application Priority Data

Feb. 26, 1987 [DE] Fed. Rep. of Germany ....... 3706176

[51] Int. Cl.$^4$ ...................... C07C 91/04; C08F 26/02; D06L 3/12; D06P 1/52

[52] U.S. Cl. ............................................ 8/554; 8/436; 8/543; 8/602; 8/604; 8/612; 8/648; 8/652; 8/680; 8/918; 8/917

[58] Field of Search .................. 8/436, 543, 554, 652, 8/680, 612

[56] References Cited

U.S. PATENT DOCUMENTS

| | | | |
|---|---|---|---|
| 4,054,542 | 10/1977 | Buckman et al. | 8/554 |
| 4,439,203 | 3/1984 | Runyon et al. | 8/496 |
| 4,441,884 | 4/1984 | Baumann et al. | 8/542 |
| 4,443,223 | 4/1984 | Kissling et al. | 8/496 |
| 4,504,640 | 3/1985 | Harada et al. | 526/193 |
| 4,511,707 | 4/1985 | Runyon et al. | 8/496 |
| 4,528,347 | 7/1985 | Harada et al. | 526/219 |
| 4,540,760 | 9/1985 | Harada et al. | 526/211 |
| 4,583,989 | 4/1986 | Ueda et al. | 8/543 |
| 4,615,709 | 10/1986 | Nakao | 8/599 |
| 4,624,743 | 11/1986 | Gess | 8/181 |

*Primary Examiner*—A. Lionel Clingman
*Attorney, Agent, or Firm*—Gerald D. Sharkin; Richard E. Vila; Thomas C. Doyle

[57] ABSTRACT

A mixture of a textile auxiliary (T) obtained by reacting epichlorohydrin and ammonia in defined mole ratio, and a polymeric compound (P) which is a water-soluble homopolymer of a mono- or di-allylamine, or a water-soluble copolymer consisting of mono-, di- or tri-allylamine units may be used as an aftertreatment agent for fixation of anionic and sulphur dyeings on cellulosic fibres. The treated dyeings have better fastness properties than dyeings treated with either (T) or (P) alone.

37 Claims, No Drawings

COMPOSITION USEFUL FOR AFTERTREATING DYEINGS, PRINTINGS AND OPTICAL BRIGHTENINGS: EPIHALDHYDRIN-AMMONIA REACTION PRODUCT AND ALLYLAMINE POLYMER

This invention relate to textile aftertreatment agents for improving the fastness properties of dyeings and printings.

The invention provides a synergistic mixture containing as active ingredients a textile auxiliary (T) and a polymeric compound (P), in which T is the product of a 2-step reaction comprising the steps of (1) reacting an epihalohydrin with aqueous ammonia at 50°–90° C. at an initial mole ratio of 4 moles epihalohydrin to 8–10 moles of ammonia, and (2) reacting the product of step (1), after removal of excess ammonia, with a further 0.1 to 0.5 moles of epihalohydrin per each 4 moles of epihalohydrin initially reacted, and P is a water-soluble homopolymer of a mono- or di-allylamine, or a water-soluble copolymer consisting of mono-, di- and/or tri-allylamine units.

In the production of T, the initial mole ratio in step (1) is preferably 4 moles epihalohydrin to 9 moles ammonia. The product of step (1) is preferably crosslinked in step (2) with 0.3–0.5 moles epihalohydrin, more preferably 0.4 moles. The epihalohydrin is preferably epichlorohydrin. The reaction product is preferably neutralized with a mineral acid, particularly sulphuric acid.

The water-soluble allylamine polymer P is preferably
(a) a homopolymer of a monoallylamine or
(b) a homopolymer of a diallylamine or
(c) a copolymer of monomer units selected from monoallylamines, diallylamines and traillylamines.

In each case the allylamine may be in free base, acid addition salt or quaternary ammonium salt form.

More preferably, P is a water-soluble polymer of type (a)–(c) above, in which any monoallylamine component is of formula I

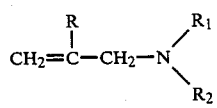

or an acid addition salt thereof, or of formula II

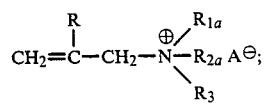

any diallylamine component is of formula III

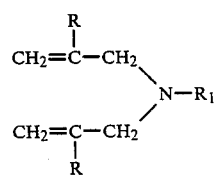

or an acid addition salt thereof, or of formula IV

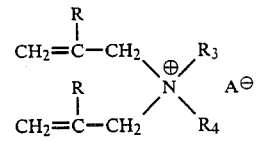

and any triallylamine component is of formula

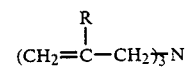

or an acid addition salt thereof, or of formula VI

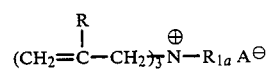

in which
R is hydrogen or methyl, preferably hydrogen
$R_1$ and $R_2$ are independently hydrogen, $C_{1-4}$ alkyl, benzyl, 2-hydroxyethyl, 2-hydroxypropyl, 3-hydroxypropyl or cyclohexyl, preferably hydrogen
$R_{1a}$, $R_{2a}$, $R_3$ and $R_4$, independently, have any significance of $R_1$ and $R_2$ other than hydrogen, or
$R_1$ and $R_2$, $R_{1a}$ and $R_{2a}$ or $R_3$ and $R_4$ may together with the nitrogen atom to which they are attached form a piperidine, morpholine or pyrrolidine ring, or
$A^-$ is an anion, preferably chloride, sulphate or phosphate.

Most preferably, P is a homopolymer of allylamine (the compound of formula I in which R, $R_1$ and $R_2$ are all hydrogen) or of diallylamine (the compound of formula II in which both R's and $R_1$ are all hydrogen), or a copolymer of these two compounds.

The proportion of P to T in the mixture according to the invention is such that a synergistic effect exists, that is, that the measured effect of the mixture is superior to the additive effect of the separate components. Preferably the mixture contains from 30:70 to 70:30 parts by weight of the components (measured as dry active material, as salt in the case of T, as free base in the case of P), more preferably from 40:60 to 60:40, particularly 50:50. The mixture is prepared by simple mixing of the components, preferably in the form of their aqueous solutions.

The mixture according to the invention is useful for aftertreatment of dyed, printed or optically brightened substrates comprising leather or textile fibres containing hydroxy-, amino- or thiol groups. Preferred textile fibre substrates are of cellulosic fibres, particularly cotton, alone or mixed with other natural or synthetic fibre for example polyester, polyamide, polyacrylonitrile, polypropylene, wool and silk. Further preferred substrates comprise cellulosic textile fibers dyed with an acid dye, a direct dye, a reactive dye or a sulphur dye.

When used for aftertreatment of a deep dye, for example corresponding to 1/1 standard depth on cotton, the amount of mixture is preferably from 1.5%–6% more preferably 2%–5% by weight based on the weight of active ingredients in the mixture and the dry weight of the substrate. For lighter shades, approximately 30–50% of the above quantities may be used.

The mixture is applied to the dyed, printed or brightened substrate by an exhaust process or by alternative methods such as padding, spraying, dipping, etc., exhaust application being preferred.

Typical application conditions are, for example, entering the substrate into the aftertreatment bath at room temperature, heating to 50°–70° C. over 20–30 min. and holding at this temperature for a further 20–30 minutes. Application is carried out under alkaline conditions, preferably at pH 9–13, more preferably pH 10–12, and the alkali to adjust the pH (e.g. sodium hydroxide) is preferably added once the optimum fixing temperature has been reached. Preferably aftertreatment is carried out in the presence of an electrolyte, for example sodium chloride, in a quantity of 5–20 g/l.

The aftertreated substrate is rinsed, neutralized and dried by conventional means. The dyed substrate may be aftertreated directly from the dyebath, after a rinsing step or after an intermediate drying step.

The polymeric compounds P are known and are described for example in published European Patent Applications No. 95 233, 140 309, 142 337 and 145 200 and in U.S. Pat. Nos. 4,504,640; 4,583,989 and 4,528,347, the disclosures of which are incorporated herein by reference. A particularly preferred compound P is a water soluble homo-polymer of mono-allylamine, prepared by polymerization of allylamine hydrochloride in the presence of an initiator containing an azo group and a group with a cationic nitrogen atom. A further preferred polymer P is a water-soluble homopolymer of diallylamine, prepared by polymerization of diallylamine hydrochloride in the presence of the same type as initiator and also of a regulator as described in British Patent Application 2 192 893A. The resulting polymer has a viscosity of 500 mPa (Brookfield viscometer, spindle no. 4, 100 rpm) to 10,000 mPa (Brookfield, spindle no. 3, 10 rpm) in 55%–65% wt. aqueous solution at room temperature.

The nature of the anionic or sulphur dye is not critical. The anionic dye may be of the type listed in Colour Index as C.I. Acid Dyes, C.I. Direct Dyes or C.I. Reactive Dyes : particularly useful dyes are those given in British Patent No. 2 070 006B. Suitable sulphur dyes are given in Colour Index and especially in U.S. Pat. No. 4,615,707.

The text auxiliary T may be prepared by the addition of epichlorohydrin to aqueous ammonia at temperatures between 50° C. and 90° C. in a suitable vessel. After reaction excess ammonia is removed by distillation, and subsequently crosslinking is carried out by reaction with a further quantity of epichlorohydrin. When the initial mole ratio of the reactants is 4:9 ECH:NH$_3$, it is found that approximately 1–1.5 moles of ammonia is recovered, so that the mole ratio actually reacted in step (1) is 4:7.5-8.

Many basic aftertreatment agents for improving the fastness properties of dyeings on cellulose fibres are known, but most do not exhibit sufficiently good wet fastness properties such as fastness to water, washing and perspiration. Practically all basic aftertreatment agents have the disadvantages that they have a negative effect upon the light fastness of the dyeing and may cause changes of shade.

Although the polymers P are reasonably effective fixing agents, textile auxiliary T has no such properties, being normally employed as a levelling agent in dyebaths. It is therefore surprising that a combination of P and T has considerably better fixation properties (especially wet fastness properties of the treated dyeings) than P alone, and that the combination is largely free of the disadvantages of most other cationic fixing agents.

The following Examples in which all parts and percentages are by weight and all temperatures in degrees Centrigrade illustrate the invention.

EXAMPLES

Example 1

Preparation of textile auxiliary T

370 Parts of 8.4 % aqueous ammonia solution are heated under nitrogen to 60° and 76 parts epichlorohydrin are gradually added over 2–3 hr, maintaining the temperature at 60°–65°. The mixture is then heated for 1 hr at 60°–65° and finally 5 hr at 90°.

The temperature is raised to 100° and 25–30 parts aqueous ammonia are distilled off. The mixture is cooled to 20°, 85 parts 30% aqueous caustic soda are added and a further 90–100 parts of aqueous ammonia was removed by distillation at 60°–70° under vacuum, until all ammonia is removed.

To the resulting product at 30is added 50 parts water and 7.7 parts epichlorohydrin, and the mixture is heated to 90°, stirred 1 hr at this temperature, cooled, neutralised to pH 6.5–7.5 with 23 parts 65% sulphuric acid, and adjusted to 30% wt active material by adding water.

Example 2

Preparation of polymer P (a) To 193.9 parts of a solution of diallylamine hydrochloride in water (68.85 % concentration) is added 8.2 parts phosphorus acid and the mixture is heated to 65° under nitrogen. A solution of 3.5 parts 2,2'-azo-bis-(2-amidinopropane) dihydrochloride in 19.8 parts water is added dropwise over 19 hours. The mixture is stirred for a further 21 hours at 65°, then heated to 95°–100°, stirred for 2 hours and cooled.

The resulting 59.2 % solution of polymer hydrochloride has a Brookfield viscosity of 1540 mPa (spindle No. 4, 50 rpm). By addition of 142 parts of 30 % aqueous solution hydroxide with stirring, the free polyamine base is obtained (367 parts of a 26.4 % solution). The viscosity of this solution is 630 mPa (Brookfield, spindle No. 4, 100 rpm).

(b) Example (a) is repeated using 4.1 parts phosphorous acid instead of 8.2 parts. The resulting polymer dihydrochloride solution (60.3 %) has a Brookfield viscosity of 2950 mPa (spindle No. 4, 20 rpm). Dilution with 215 parts water and addition of 265.2 parts of 30 % sodium hydroxide solution gives a 21 % aqueous solution of the polymer base, having a Brookfield viscosity of 225 mPa (spindle No. 3, 100 rpm).

(c) 498.7 Parts of 75 % aqueous allylamine hydrochloride solution and 793.5 parts of an 67.3 % aqueous solution of diallylamine hydrochloride are mixed under nitrogen and heated under nitrogen to 65°. A solution of 31.5 parts 1,2'-azo-bis-(2-amidinopropane)dihydrochloride in 175.5 parts water is prepared, and 1/10 of this solution (21 parts) is added to the monomer solution while stirring vigorously. An exothermic polymerization reaction begins, and the reaction mixture is kept to 65°–75° by cooling. After the exotherm subsides, but no sooner than 1½ hrs, a further 21 parts of the initiator solution is added, and this procedure is continued. After four additions of initiator there is practivally no further exotherm. After all the initiator has been added, the mixture is stirred for a further 3 hr at 75°, then cooled. The resulting solution is neutralised with 106.5 parts 30

% sodium hydroxide solution and diluted with 181.3 parts water, giving 1790 parts of a viscous liquid containing 34.4.% of free polyamine.

(d) 1000 Parts of a 70% aqueous solution of monoallylamine hydrochloride are reacted with a solution of 17.5 parts 2,2'-azo-bis-(2-amidinopropane) in 37.5 parts of water as follows:

After heating the monomer solution to 50° under an inert atmosphere, half of the initiator solution (27.5 parts) is added.

After 30 hours polymerisation, the second half of the initiator solution is added. After a further 30 hr the polyallylamine hydrochloride is obtained as a water-free white powder by precipitation in methanol.

(e) 228 Parts of allylamine are cooled to 5-10° and slowly reacted with 389 parts of 37% aqueous hydrochloric acid, with external cooling. The salt solution is warmed to 70° under nitrogen, and a solution of 14 parts of 2,2'-azo-bis-(2-amidino-propane) dihydrochloride in 80 parts water is added continuously over 20 hr. After addition is complete the mixture is stirred for a further 10 hr at 70°, then 2 hr at 90°, and finally cooled to give 711 parts of polyallylamide hydrochloride solution containing 52.6% polyallylamine hydrochloride, corresponding to 32% free polyallylamine base.

EXAMPLE 3

(a) 50 Parts of the product of Example 2(e) are stirred at 30° with 50 parts of the product of Example 1, until a clear solution is obtained.

(b) - (e) Examples 2(a) and (b) are carried out with adjustment of the water content so that aqueous solutions containing 30-35% of polymer as free polamine are obtained. The solid product of Example 2(d) is dissolved in water to give a solution containing 30-35% of polymer as free polyamine. Example 3 (a) is repeated, using in place of 50 parts of the product of Example 2(e), 50 parts of the product of Examples 2(a)-(d), in the form of 30-35% aqueous solution.

Application Example A

A 100% cotton knit fabric is dyed with 3% of the dye of Example 3 of U.S. Pat. No. 4,475,918, and aftertreated in an exhaust process at a goods-to-liquor ratio of 1:20 with 3% of the product of Example 3(a). The bath contains 10 g/l sodium chloride and 2 g/l sodium hydroxide, to give a pH value of 12. The bath is initially at room temperature and is raised to 60° over 20 minutes. Finally the goods are rinsed, neutralized with acetic acid, rinsed again, and dried in conventional manner.

A blue dyeing with excellent wet fastness properties is obtained, whereby the shade following the aftertreatment is practically identical with the shade before treatment.

Good results are also obtained when 2% of the product of Example 3(a) is used.

Application Example B

Example A is repeated, using 4.5% of the mixture of Example 3(a) on a 3% dyeing with the reactive dyestuff of Example 5 of U.S. Pat. No. 4,475,918. A dyeing with excellent wet fastness and fastness to oxidizing agents is obtained.

By comparison the same dyeing without aftertreatment, or aftertreated with either polymer P or textile auxiliary T alone has significantly poorer wet fastness properties. Furthermore, such dyeings have inadequate fastness to perborate and chlorine.

Application Example C

A 1/1 standard depth dyeing of C.I. Leuco Sulfur Blue 13, aftertreated with 2% of the product of Example 3(a) according to the process of Example A, has excellent wet fastness properties.

What is claimed is:

1. A synergistic mixture containing as active ingredients a textile auxiliary (T) and a polymeric compound (P), in which
    T is the product of a 2-step reaction comprising the steps of (1) reacting an epihalohydrin with aqueous ammonia a 50°-90° C. in an initial mole ratio of 4 moles epihalohydrin to 8-10 moles of ammonia, and (2) reacting the product of step (1), after removal of excess ammonia, with a further 0.1 to 0.5 moles of epihalohydrin per each 4 moles of epiphalohydrin initially reacted, and
    P is a water-soluble homopolymer of a mono- or di-allylamine, or a water-soluble copolymer consisting of mono-, di- or tri-allylamine units.

2. A mixture according to claim 1 in which T is the product of reacting epichlorohydrin with ammonia in an initial mole ratio of 4 moles epichlorohydrin to 9 moles ammonia, further reacted with 0.4 moles epichlorohydrin.

3. A mixture according to claim 1 in which polymer P is
    (a) a homopolymer of a monoallylamine or
    (b) a homopolymer of a diallylamine or
    (c) a copolymer of monomer units selected from monoallylamines, diallylamines and triallylamines,
in which any monoallylamine component is of formula I $$CH_2=\overset{R}{\underset{|}{C}}-CH_2-N\overset{R_1}{\underset{R_2}{\diagdown}} \qquad I$$

or an acid addition salt thereof, or of formula II $$CH_2=\overset{R}{\underset{|}{C}}-CH_2-\overset{\oplus}{N}\overset{R_{1a}}{\underset{R_3}{\diagdown}}-R_{2a}\ A^\ominus; \qquad II$$

any diallylamine component is of formula $$\begin{array}{c} CH_2=\overset{R}{\underset{|}{C}}-CH_2 \\ \diagdown \\ N-R_1 \\ \diagup \\ CH_2=\overset{R}{\underset{|}{C}}-CH_2 \end{array} \qquad III$$

or an acid addition salt thereof, or of formula $$\begin{array}{c} CH_2=\overset{R}{\underset{|}{C}}-CH_2 \\ \diagdown \overset{\oplus}{N}\diagup R_3 \\ \diagup \quad \diagdown A^\ominus \\ CH_2=\overset{R}{\underset{|}{C}}-CH_2 \quad R_4 \end{array} \qquad IV$$

and any triallylamine component is of formula

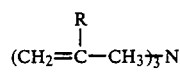 V or an acid addition salt thereof, or of formula

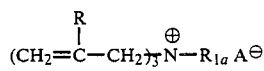 VI in which
R is hydrogen or methyl,
$R_1$ and $R_2$ are independently hydrogen, $C_{1-4}$alkyl, benzyl, 2-hydroxyethyl, 2-hydroxypropyl, 3-hydroxpropyl or cyclohexyl,
$R_{1a}$, $R_{2a}$, $R_3$ and $R_4$, independently have any significance of $R_1$ and $R_2$ other than hydrogen, or
$R_1$ and $R_2$, $R_{1a}$ and $R_{2a}$ or $R_3$ and $R_4$ may together with the nitrogen atom to which they are attached form a piperidine, morpholine or pyrrolidine ring, and
$A^-$ is an anion.

4. A mixture according to claim 3 in which polymer P is a homopolymer of the compound of formula I or III in which R, $R_1$ and $R_2$ are all hydrogen, or a copolymer of these two compounds.

5. A mixture according to claim 4 in which polymer P is a homopolymer of monoallylamine.

6. A mixture according to claim 1 in which the weight ratio of P to T is from 30:70 to 70:30.

7. A process for aftertreatment of dyed, printed or optically brightened substrates comprising leather or textile fibres containing hydroxy-, amino- or thiol groups, comprising the step of applying to the substrate a mixture according to claim 1.

8. A process according to claim 7 in which the mixture is applied to the substrate from an exhaust bath at pH 9–13.

9. A process according to claim 7 in which the substrate comprises cellulosic textile fibres dyed with an acid dye, a direct dye, a reactive dye or a sulphur dye.

10. A mixture according to claim 1 wherein T is the product of reacting an epihalohydrin with ammonia in an initial mole ratio of 4:9 in step (1) and reacting the product of step (1) with a further 0.3 to 0.5 mole epihalohydrin in step (2).

11. A mixture according to claim 3 wherein T is the product of reacting an epihalohydrin with ammonia in an initial mole ratio of 4:9 in step (1) and reacting the product of step (1) with a further 0.3 to 0.5 mole epihalohydrin in step (2).

12. A mixture according to claim 3 in which R is hydrogen.

13. A mixture according to claim 3 in which T is the product of reacting epichlorohydrin with ammonia in an initial mole ratio of 4 moles epichlorohydrin to 9 moles ammonia, further reacted with 0.4 moles epichlorohydrin.

14. A mixture according to claim 4 wherein T is the product of reacting an epihalohydrin with ammonia in an initial mole ratio of 4:9 in step (1) and reacting the product of step (1) with a further 0.3 to 0.5 mole epihalohydrin in step (2).

15. A mixture according to claim 4 in which T is the product of reacting epichlorohydrin with ammonia in an initial mole ratio of 4 moles epichlorohydrin to 9 moles ammonia, further reacted with 0.4 moles epichlorohydrin.

16. A mixture according to claim 5 in which T is the product of reacting epichlorohydrin with ammonia in an initial mole ratio of 4 moles epichlorohydrin to 9 moles ammonia, further reacted with 0.4 moles epichlorohydrin.

17. A mixture according to claim 11 wherein T is the product of neutralizing the product of step (2) with a mineral acid.

18. A mixture according to claim 14 wherein T is the product of neutralizing the product of step (2) with a mineral acid.

19. A mixture according to claim 16 wherein T is the product of neutralizing the product of step (2) with sulfuric acid.

20. A mixture according to claim 3 in which the weight ratio of P to T is from 30:70 to 70:30.

21. A mixture according to claim 14 in which the weight ratio of P to T is from 30:70 to 70:30.

22. A mixture according to claim 17 in which the weight ratio of P, as free base, to T, as salt, is 40:60 to 60:40.

23. A mixture according to claim 18 in which the weight ratio of P, as free base, to T, as salt, is 40:60 to 60:40.

24. A mixture according to claim 17 in which the weight ratio of P, as free base, to T, as salt, is 40:60 to 60:40.

25. A process for the aftertreatment of a dyed, printed or optically brightened substrate comprising leather or textile fibres cotnaining hydroxy, amino or thiol groups comprising the step of applying to the substrate a mixture according to claim 3.

26. A process for the aftertreatment of a dyed, printed or optically brightened substrate comprising leather or textile fibres containing hydroxy, amino or thiol groups comprising the step of applying to the substrate a mixture according to claim 14.

27. A process for the aftertreatment of a dyed, printed, or optically brightness substrate comprising leather or textile fibres containing hydroxy, amino or thiol groups comprising the step of applying to the substrate a mixture according to claim 16.

28. A process for the aftertreatment of a dyed, printed or optionally brightened substrate comprising leather to textile fibres containing hydroxy, amino or thiol groups comprising the step of applying to the substrate a mixture according to claim 21.

29. A process for the aftertreatment of a dyed, printed or optically brightened substrate comprising leather or textile fibres containing hydroxy, amino or thiol groups comprising the step of applying to the substrate a mixture according to claim 22.

30. A process according to claim 25 in which the mixture is applied to the substrate from an exhaust bath at pH 9–13.

31. A process according to claim 26 in which the mixture is applied to the substrate from an exhaust bath at pH 9–13.

32. A process according to claim 27 in which the substrate comprises cellulosic textile fibres dyed with an acid dye, a direct dye, a reactive dye or a sulphur dye and the mixture is applied to the substrate from an exhaust bath at pH 9–13.

33. A process according to claim 28 in which the substrate comprises cellulosic textile fibres dyed with an acid dye, a direct dye, a reactive dye or a sulphur dye and the mixture is applied to the substrate from an exhaust bath at pH 9–13.

34. A process according to claim 29 in which the substrate comprises cellulosic textile fibre dyed with an acid dye, a direct dye, a reactive dye or a sulphur dye and the mixture is applied to the substrate from an exhaust bath at pH 9–13.

35. A process according to claim 25 wherein the mixture is used in an amount such that the weight of active ingredients is 0.45 to 6% based on the dry weight of the substrate.

36. A process according to claim 30 wherein the mixture is used in an amount such that the weight of active ingredients is 0.45 to 6% based on the dry weight of the substrate.

37. A process according to claim 34 wherein the mixture is used in an amount such that the weight of active ingredients is 0.45 to 6% based on the dry weight of the substrate.

* * * * *